United States Patent
Kirkwood et al.

[11] Patent Number: 6,000,510
[45] Date of Patent: *Dec. 14, 1999

[54] FUNCTIONALLY ENHANCED HYDROKINETIC DEVICE HAVING CLUTCH ASSEMBLY OPERABLE AT LOW ENGINE SPEEDS

[75] Inventors: Malcolm E. Kirkwood, Livonia; Michael E. Fingerman, West Bloomfield, both of Mich.

[73] Assignee: Borg-Warner Automotive, Inc., Troy, Mich.

[ * ] Notice: This patent is subject to a terminal disclaimer.

[21] Appl. No.: 08/931,747

[22] Filed: Sep. 16, 1997

Related U.S. Application Data

[63] Continuation-in-part of application No. 08/735,778, Oct. 23, 1996, Pat. No. 5,771,691.

[51] Int. Cl.$^6$ .............................. F16H 46/02; F16D 13/72
[52] U.S. Cl. ................. 192/3.29; 192/70.12; 192/113.36
[58] Field of Search ................. 192/3.29, 70.12, 192/113.36, 113.35, 3.28, 3.3

[56] References Cited

U.S. PATENT DOCUMENTS

| | | |
|---|---|---|
| 2,304,721 | 12/1942 | Werther . |
| 2,429,503 | 10/1947 | Zeidler . |
| 2,660,957 | 12/1953 | Koskinen . |
| 2,839,950 | 6/1958 | Russell . |
| 2,963,867 | 12/1960 | Amiard . |
| 3,385,060 | 5/1968 | Lazarus . |
| 3,507,118 | 4/1970 | Yamaguchi et al. . |
| 3,665,707 | 5/1972 | Koivunen .................. 60/54 |
| 3,888,082 | 6/1975 | Haide ...................... 60/361 |
| 4,086,766 | 5/1978 | Stieger ..................... 60/330 |
| 4,155,222 | 5/1979 | Ahlen ...................... 60/361 |
| 4,441,315 | 4/1984 | Bochot ..................... 60/345 |
| 4,510,747 | 4/1985 | Yoshida .................... 60/343 |
| 4,608,823 | 9/1986 | Maze ....................... 60/361 |
| 4,674,616 | 6/1987 | Mannino, Jr. ............. 192/113.36 X |
| 4,726,185 | 2/1988 | Shigemasa et al. ......... 60/361 |
| 5,168,702 | 12/1992 | Sakakibara et al. ........ 60/345 |
| 5,224,348 | 7/1993 | Ejiri ........................ 60/361 |
| 5,271,716 | 12/1993 | Ejiri ........................ 416/180 |
| 5,279,118 | 1/1994 | Hara et al. ................ 60/365 |
| 5,282,362 | 2/1994 | Renneker et al. .......... 60/345 |
| 5,313,793 | 5/1994 | Kirkwood et al. .......... 60/361 |
| 5,337,867 | 8/1994 | Kirkwood ................ 192/3.29 |
| 5,377,562 | 1/1995 | Kitagawa et al. .......... 477/110 |
| 5,522,220 | 6/1996 | Locker ..................... 60/361 |
| 5,566,802 | 10/1996 | Kirkwood ................ 192/3.29 |
| 5,669,474 | 9/1997 | Dehrmann et al. ........ 192/3.29 |
| 5,738,198 | 4/1998 | Walth et al. ............. 192/113.36 |
| 5,799,763 | 9/1998 | Dehrmann ............... 192/3.29 |

OTHER PUBLICATIONS

Society of Automotive Engineers, "Design Practices—Passenger Car Automatic Transmissions", 1973, pp. 165–226.

*Primary Examiner*—Rodney H. Bonck
*Assistant Examiner*—Saul J. Rodriguez
*Attorney, Agent, or Firm*—Bliss McGlynn, P.C.; Greg Dziegielewski

[57] ABSTRACT

A torque converter for translating kinetic energy between a prime mover and a transmission including a torque input member and an impeller assembly operatively coupled for rotation with the torque input member. A turbine assembly is fluidly connected in driven relationship with the impeller assembly. A clutch assembly is supported for selective operation with the turbine assembly and interposed between the turbine assembly and the torque input member. The clutch assembly may be a continuously slipping bypass clutch which is selectively movable into engagement with the torque input member to provide torque translation between the torque input member and the turbine assembly at low engine speeds. The continuously slipping bypass clutch includes annular friction clutch facings having at least one circuitous groove providing fluid communication between the high and low pressure cavity in the torque converter and wherein the groove includes at least one bridge portion spanning the groove to interconnect either side of the groove in the clutch facing.

33 Claims, 9 Drawing Sheets

FUNCTIONALLY ENHANCED HYDROKINETIC DEVICE HAVING CLUTCH ASSEMBLY OPERABLE AT LOW ENGINE SPEEDS

RELATED APPLICATIONS

This application is a Continuation-in-Part of copending U.S. Ser. No. 08/735,778 filed Oct. 23, 1996, now U.S. Pat. No. 5,771,691 entitled TORQUE CONVERTER HAVING SPATIALLY ORIENTED FLAT TURBINE BLADES.

BACKGROUND OF THE INVENTION

1. Field of the Invention

The present invention relates, generally, to hydrokinetic couplings used to transfer kinetic energy and, more specifically, to a torque converter having a clutch assembly which is operable to provide direct torque translation between the torque input member of a transmission through the turbine assembly at low engine speeds.

2. Description of the Related Art

In automotive applications, engine torque and speed are translated between a prime mover, such as an internal combustion engine, to one or more wheels through the transmission in accordance with the tractive power demand of the vehicle. Hydrokinetic devices, such as torque converters, are often employed between the internal combustion engine and its associated transmission for transferring kinetic energy therebetween.

Figure 1:
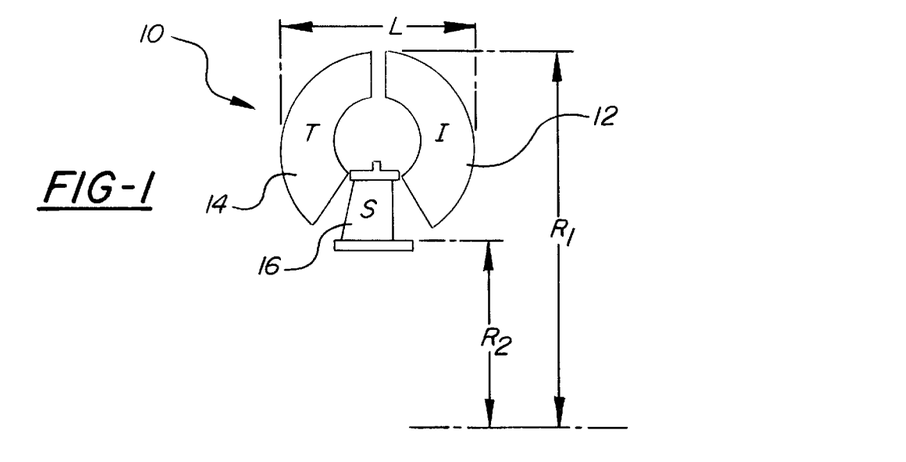
FIG. 1 is a schematic diagram of a torque converter.

As illustrated schematically in FIG. 1, torque converters 10 include impeller assemblies 12 operatively connected for rotation with the torque input from the internal combustion engine, a turbine assembly 14 fluidly connected in driven relationship with the impeller assembly and a stator or reactor assembly 16. These assemblies together form a substantially toroidal flow passage for kinetic fluid in the torque converter. Each assembly includes a plurality of blades or vanes which act to convert mechanical energy to hydrokinetic energy and back to mechanical energy. The stator assembly 16 of a conventional torque converter is locked against rotation in one direction but is free to spin about an axis in the direction of rotation of the impeller assembly 12 and turbine assembly 14. When the stator assembly 16 is locked against rotation, the torque is multiplied by the torque converter. During torque multiplication, the output torque is greater than the input torque for the torque converter.

Impeller, turbine and reactor blades may be either cast or stamped to a desired shape. Cast blades are most often employed for stators. In addition, cast blades are also employed in turbine and impeller assemblies in large industrial applications. Cast blades generally have varying thicknesses in the radial and axial directions and contoured working surfaces.

Stamped metal blades are typically cold worked in a form die such that they include ribs stamped thereon for rigidity and strength. Arcuate contours are also imparted to the stamped plate worked blades such that the blades have complex three dimensional working surfaces. For example, conventional turbine blades are curved between fluid inlet, the torroidal shell and core surfaces and the fluid outlet. This is referred to in the art as a "ruled surface" and is generated in production by the form die.

The shape and contour of the blades (blade form) are important considerations which can have significant effects on the capacity, torque ratio, efficiency and overall performance of the torque converter as well as overall powertrain efficiency. Due in part to this performance sensitivity, the contoured, stamped blades must be made with specific materials which have limited "spring back" characteristics such that there is very little or no deviation from the shape imparted to the metal in the form die.

Accordingly, the shape and contour of conventional blades in the related art must be tightly controlled during production. Such control and sensitive manufacturing procedures increase the cost of manufacturing the torque converter. Thus, there is a need in the art for simplified blades which have good performance characteristics and which can be manufactured at lower costs.

Torque converter performance characteristics can be measured by observing the relationships between torque ratio ($T_2/T_1$), where $T_1$ is the torque input to the converter and $T_2$ is the torque output of the converter; speed ratio ($N_2/N_1$), where $N_1$ is the rotational speed input to the converter and $N_2$ is the rotational speed output from the converter; efficiency; and K-factor curves. The K-factor is related to torque converter capacity and slip. In conventional torque converters, the K-factor typically shows a significant rise between speed ratios of 0.5–0.85 as compared to lower speed ratios of between 0–0.3. A rise in the K-factor curve has a negative effect on overall powertrain efficiency. Thus, it is highly desirable to increase or maintain powertrain efficiency by inhibiting the rise in the K-factor curve.

When the torque ratio is 1.0 or less, the stator assembly 16 will "free wheel" or spin in the direction of rotation of the impeller assembly 12 and the turbine assembly 14. The "coupling point" is a term used in the related art to describe the point where the torque ratio is 1.0. At the coupling point, there is no torque multiplication as described above. When there is no torque multiplication, the torque converter becomes a fluid coupling. Fluid couplings have inherent slip. Torque converter slip exists when the speed ratio is less than 1.0 (rpm input>rpm output of the torque converter). The inherent slip reduces the efficiency of the torque converter.

Conventional torque converters often employ clutches interposed between a torque input member and the turbine assembly which are engaged and "lock up" at high speed ratios of between 0.88–0.98. When the clutch is locked up there is a direct torque translation between the torque input member and the transmission through the turbine assembly. The locked up clutch eliminates the slip inherent with the fluid coupling and results in an efficiency gain for the torque converter. However, the transmission is usually shifted from first through second and sometimes into third and fourth gear before the clutch locks up. Depending on throttle position and shift strategy, this may occur at vehicle speeds of between 40 and 45 mph. Thus, conventional lock up clutches are generally engaged only after the torque converter has been operating as a fluid coupling limiting powertrain efficiency. Theoretically then, the earlier the clutch is engaged, significant output efficiency gains can be realized. However, as explained below, clutches in the related art are typically actuated at higher speed ratios to avoid translation of vibration noise, etc.

At lower engine speeds (and thus torque converter speed ratios) there typically exists significant drive line torsional vibration. When the clutch is disengaged, the torque converter acts as a fluid damper and absorbs, dissipates or otherwise fails to translate these vibrations.

Thus, clutches are typically only operated at higher engine speeds (and speed ratios) where the resonant vibration, noise, etc. are not as severe. Clutch assemblies of the related art also employ torsional dampers to further attenuate the vibration, noise, etc. that occur. However, torsional dampers add weight, cost and complexity to the clutch assembly and the torque converter in general.

Thus, there is a need in the art for a torque converter which includes a clutch assembly which is operable at lower engine speeds at the approximate coupling point of the torque converter which thereby avoids inherent slip and increases the efficiency of the torque converter. In addition, there is a need in the art for such a torque converter which does not translate drive line vibrations but which also does not require a torsional damper. Finally, there is a need in the art for such a torque converter which enjoys these improved operating parameters and which has reduced weight, cost and complexity as compared with such devices in the related art.

Continuously slipping bypass friction clutches are known in the related art to enhance the operating efficiency of hydrokinetic torque converters and are sometimes employed to address the problems identified above. These clutches are subjected to a continuously slipping operational mode. However, without adequate cooling by the operating hydraulic fluid in the converter, they can generate excessively elevated temperatures leading to catastrophic degradation of both the facing material and the operating hydraulic fluid. The hydraulic fluid is a special oil formulation commonly known as automatic transmission fluid or ATF.

To maintain functional design intent characteristics, two critical phenomena must be satisfied for best slipping clutch performance. One is the ability to efficiently conduct heat away from the clutch interface zone. The other is the ability to maintain a wetted interface zone avoiding potential areas of so-called "dry friction" that can produce erratic friction characteristics and excessive or uneven wear resulting in a significantly shortened clutch life. Moreover, a hydrokinetic torque converter presents specific restrictions on function that most other forms of wet clutches do not experience. For example, space limitation in the converter usually dictates a very limited number of interface zones of relatively large annular area with the most common typically having only one interface zone. A more advanced compact heat resistant design having multiple interface zones is disclosed in U.S. Pat. No. 5,337,867. In such converters with a continuous slip bypass clutch, the hydraulic circuit within the converter typically includes cavities that surround the outer diameter of the interface zone with high pressure hydraulic fluid and the inner diameter thereof with a low or zero pressure hydraulic fluid. This condition exists in concert with total assembly rotational velocity. The differential pressure between these cavities is modulated and utilized to apply the bypass clutch to control the slip speed in the clutch while fluid is circulated through the interface clutch zones from the high pressure cavity to the low pressure cavity to wet and cool the clutch friction surface interfaces. However, the volumetric flow of oil through the interface zones is typically restricted to very small values (e.g. not exceeding 1 gpm) because of the restrictions imposed on the hydraulic supply circuit serving the converter circuit and the slipping bypass clutch limiting the ability to both adequately wet and cool the clutch surfaces. Moreover, it is desired that the bypass clutch is capable of extended operational periods in a low velocity slip mode (e.g. 300–10 rpm relative speed) at high interface energy levels (watts/mm$^2$) that result in extremely high heat generation at the respective clutch interface zones.

In an attempt to meet these objectives, various forms of groove or channel patterns in the clutch facing frictional liner material have been proposed such as radial grooves, cross-hatch grooves and a combination of radial and annular grooves. Examples of such prior art groove patterns are shown and described in U.S. Pat. No. 5,566,802 and incorporated herein by reference.

The groove patterns known in the prior art attempt to control the flow of ATF between the high pressure and low pressure cavities and across the friction liner for purposes of wetting with various degrees of success. The groove patterns are typically cut on the paper based frictional liner facing materials using a die. When some groove patterns are cut, they result in a segmentation of the friction liner material into muitiple pieces. The multiple pieces must then be assembled like a jigsaw puzzle onto the face of the friction plates. This takes time and is labor intensive, ultimately increasing the cost of the manufacturing process. Thus, there is a need in the art for a continuously slipping clutch equipped with friction liners having adequate grooving for wetting and cooling purposes but which are not segmented into multiple sections when die cut during a manufacturing process.

In addition to the efforts to maximize performance of the torque converter, there are also design considerations which dictate minimizing, to the extent possible, the space occupied by the torque converter in a transmission housing. However, these "packaging" design objectives often compete with optimum performance requirements. Torque converter packaging may be considered in relation to the ratio of the toroidal axial length L to the radial dimension of the torque converter expressed as $R_1-R_2$, where $R_1$ is the outer radius of the torroid and $R_2$ is the inner radius of the torroid, measured from the axis of rotation 18 as shown schematically in FIG. 1.

This relationship, $L/(R_1-R_2)$, is known in the art as the "squash ratio". Reducing the squash ratio, i.e. minimizing toroidal axial length versus toroidal radial dimension, increases the "squash" of the torque converter and is desirable from a packaging standpoint. Conventional torque converters typically have squash ratios of approximately 1.0. However, and as a general matter, a reduction of the squash ratio has a negative effect on the K-factor curve and reduces the efficiency of the torque converter and the overall efficiency of the powertrain.

Thus, in addition to lowering the cost of manufacturing such turbine blades, there is a need in the art for a turbine blade which has less performance sensitivity, which can be employed in a torque converter having relatively more "squash" than torque converters in the related art, but which does not negatively effect the performance requirements of the torque converter.

SUMMARY OF THE INVENTION

The present invention overcomes the disadvantages in the related art in a torque converter for translating kinetic energy between a prime mover and a transmission. The torque converter includes a torque input member and an impeller assembly operably coupled for rotation with the torque input member. A turbine assembly is fluidly connected in driven relationship with the impeller assembly. The torque converter further includes a clutch assembly supported for selective operation with the turbine assembly and interposed between the turbine assembly and the torque input member. The clutch assembly is selectively moveable into engagement with the torque input member to provide torque translation between the torque input member and the turbine assembly at low speed ratios.

In one preferred embodiment, the clutch assembly is a continuously slipping bypass clutch having at least one pair of annular friction clutch facings for transmitting torque therebetween. The annular friction clutch facings have an inner and outer edge defining a prescribed width and at least one circuitous groove extending a substantial annular distance about the facing adapted to direct hydraulic fluid in a hydrokinetic torque converter from a high pressure cavity at the outer edge of the facing and across the width of the facing in a circuitous path in at least three transversing passes to a low pressure cavity at the inner edge of the facing. The groove has an inlet section that defines one of the passes with the inlet section including an inlet that is adapted to open the groove at the outer edge of the facing to a high pressure cavity. The groove also has an outlet section that defines another of the passes and has an outlet that is adapted to open the groove at the inner edge of the facing to the low pressure cavity at a location remote from the inlet. The circuitous groove includes at least one bridge portion spanning a portion of the circuitous groove to interconnect either side of the groove in the clutch facing.

Because the clutch assembly is capable of operation at lower engine speeds (and speed ratios), slip inherent with all hydrodynamic devices is mitigated. Thus, the efficiency of the torque converter is increased as compared with similar devices in the related art. The present invention also achieves these results using a clutch assembly which does not translate driveline vibration and which also does not require a torsional damper. The grooves in the annular clutch facings provide wetting of essentially the entire area of the clutch interfaces, cools the clutch with a viscous pumping action that augments cooling hydraulic fluid flow induced through the circuitous flow path by the pressure differential between the high and low pressure cavities and also provides a flow limiting action wherein the groove functions as a critical flow limiting orifice between the high and low pressure cavities within the torque converter. Moreover, the grooves are readily manufacturable in a cost effective manner in that they are die cut or embossed in the paper based friction liners together with the overall shape of the friction liners prior to their bonding to clutch plates. The bridge portions in the grooves ensure that no matter what the form of the groove, the friction liner produced in this manufacturing process will be a one piece unit which may be quickly and easily bonded to the clutch plates. Thus, the improved operating parameters mentioned above are achieved in a torque converter which has reduced weight, cost and complexity as compared with such devices in the related art.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 2:
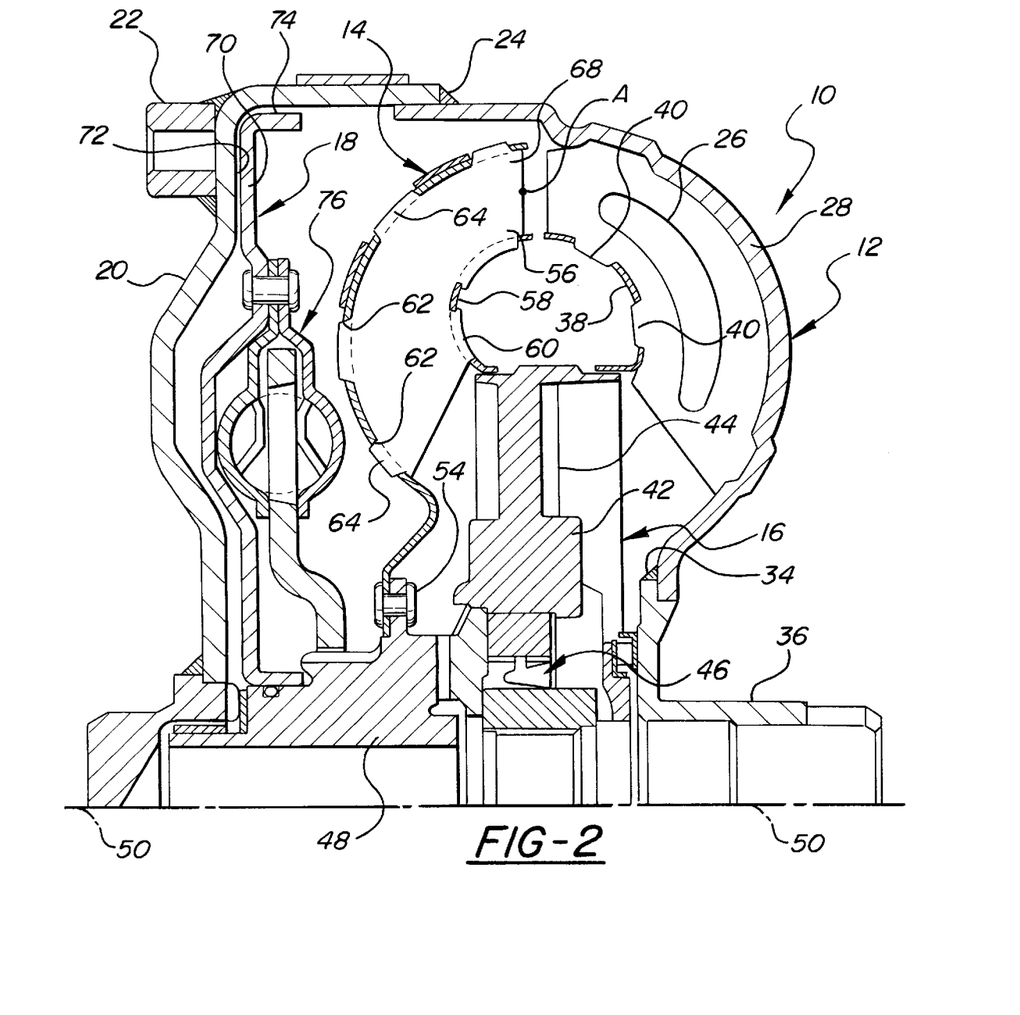
FIG. 2 is a partial cross-sectional side view of a torque converter employing the turbine blades of the present invention.

Referring now to the Figures, where like numerals are used to describe like structure, a hydrodynamic torque converter for translating torque from a prime mover such as an internal combustion engine (not shown) to the input shaft of a transmission is generally shown at 10 in FIG. 2. The transmission may then subsequently distribute this power to one or more wheels (not shown) through other drive train components such as a drive shaft and an axle having a differential (also not shown). While the torque converter illustrated in the Figures is particularly adapted for use with an automotive vehicle, those skilled in the art will understand that the torque converter may be employed in connection with other types of transmissions.

The torque converter 10 includes an impeller assembly, generally indicated at 12, a turbine assembly generally indicated at 14, a stator assembly, generally indicated at 16, and a clutch assembly, generally indicated at 18. Each of these assemblies will be described in greater detail below.

Power is transmitted from the rotating crank shaft (not shown) of the engine to a torque input member or front cover 20 of the torque converter. The front cover 20 may include a plurality of input drive lugs or threaded connectors 22. A rotatable plate (not shown) is typically secured to the front cover member 20 by suitable fastening means such as bolts (not shown) which are received in the connectors 22 as is commonly known in the art. The front cover 20 is secured, typically by welding as indicated at 24, to the impeller assembly 12 of the hydrodynamic torque converter 10.

The impeller assembly 12 is fluidly connected in torsional flow relationship in a known manner with the turbine assembly 14 and the stator assembly 16. The impeller assembly 12 includes a plurality of annularly spaced contoured impeller blades 26 connected to the inside of an impeller shell 28. The impeller shell 28 is fixed, as for example by welding at 34, to an impeller hub or host transmission hydraulic pump drive shaft 36. The impeller hub 36 may drive a pump (not shown) from which fluid is supplied to the hydrodynamic torque converter 10. The impeller blades 26 have an arcuate inner portion which is fixed to an impeller core 38 through the interaction of wings 40 received in corresponding slots of the ring 38.

The stator assembly 16 is interposed between the impeller assembly 12 and the turbine assembly 14 and includes a cast stator hub 42 and a plurality of stator vanes 44 spaced circumferentially about the stator hub 42. The stator assembly 16 includes a one way clutch assembly, generally indicated at 46, for allowing the stator hub 42 and the stator vanes 44 to rotate or "free wheel" in the direction of rotation of the impeller assembly 12 and the turbine assembly 14. The stator assembly 16 locks in the opposite rotational direction to provide torque multiplication.

Figure 4:
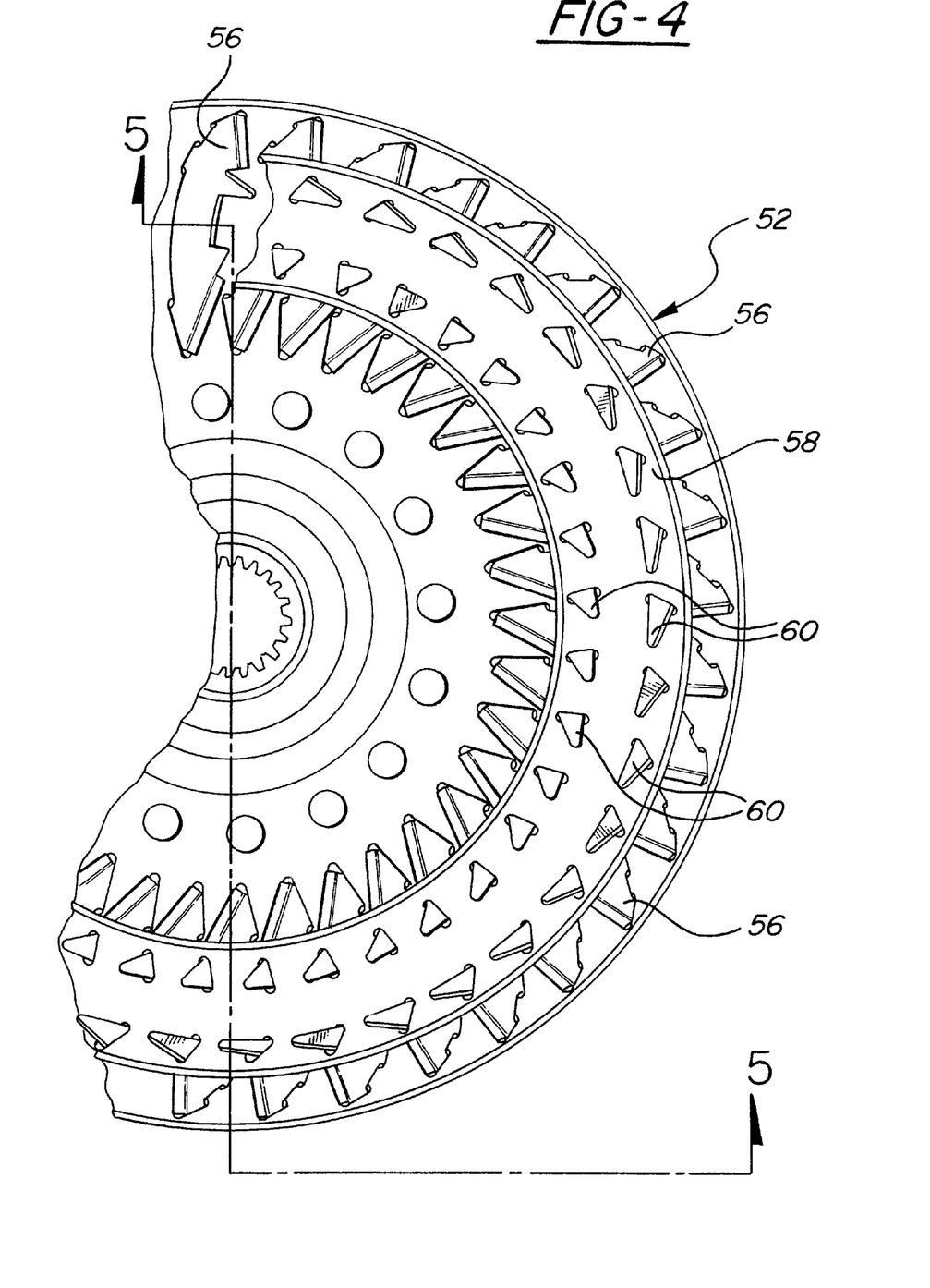
FIG. 4 is a partial plan view of the turbine assembly of the present invention.

The turbine assembly 14 is fluidly connected in driven relationship with the impeller assembly 12. The turbine assembly 14 includes an annular turbine hub 48 which is operatively connected to the input of the transmission and is rotatable about an axis 50. A turbine shell 52 is mounted to the turbine hub 48 via rivets 54 or some other suitable fastener. A plurality of turbine blades 56 are carried by the turbine shell 52 as will be described in greater detail below. As best shown in FIGS. 2 and 4, the turbine blades 56 include arcuate inner portions which are fixed to the turbine core 58 through the interaction of wings 60 received in corresponding slots in the turbine core 58.

The torque converter 10 defines a torroidal flow path for the fluid contained therein. The turbine shell 52 forms a part of this torroid and is thus semi-torroidal in shape. The turbine shell 52 includes rows of radially spaced slots 62 wherein the slots 62 in each of the rows are spaced relative to one another. Likewise, the turbine blades 56 include a series of annularly spaced tabs 64 which correspond to the rows of radially spaced slots 62 in the turbine shell 52. The tabs 64 extend through the slots 62 and are bent at an angle relative to the turbine blades 56 to fix the blades 56 relative to the turbine shell 52, as best shown in FIG. 5.

Figures 3, 5:
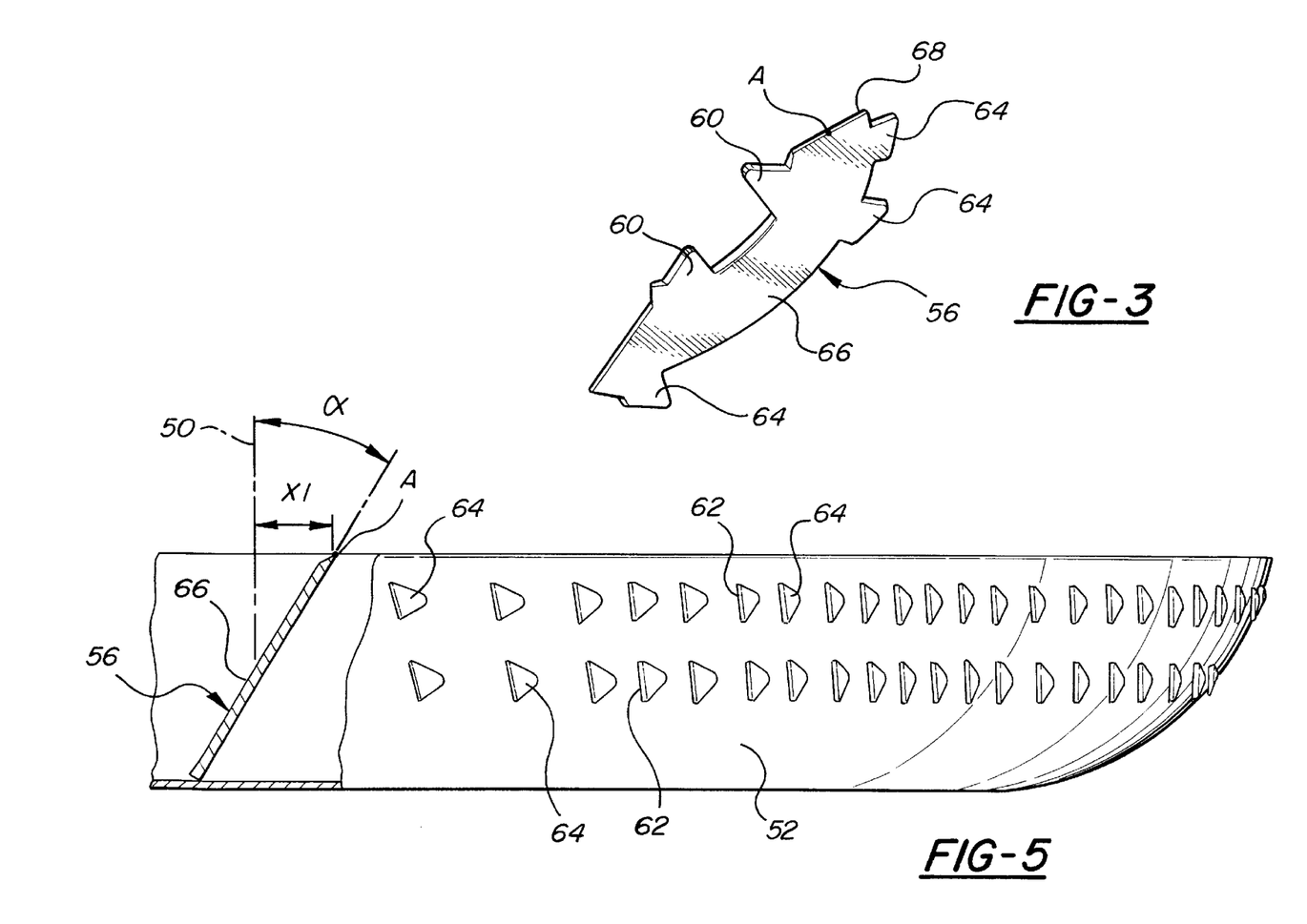
FIG. 3 is a perspective view of the flat turbine blade of the present invention.
FIG. 5 is a partial sectional view of the turbine assembly of the present invention taken substantially along lines 5—5 of FIG. 4.

Referring now to FIG. 3, each of the turbine blades 56 of the present invention include a flat working surface 66 such that each turbine blade 56 is contained in a single plane. Thus, form dies which impart contoured "ruled surfaces" are not required during the manufacture of the turbine blades 56 of the present invention. Furthermore, because the turbine blades 56 of the present invention are planar and without surface curvature or contour, they may be manufactured from a low carbon steel such as SAE 1010 without the concerns of "spring back" which is typically encountered during the manufacture of contoured blades.

Each of the turbine blades 56 has a leading edge 68 which includes a point A. When viewed as illustrated in FIG. 5, the point A on each of the turbine blades 56 is disposed a distance X1 from a plane containing the axis of rotation 50 of the turbine assembly 10. This distance, X1, may be between −30 mm and 30 mm. Further and as viewed in FIG. 2, the point A on the turbine blades 56 will be located on the mean path of the torus of the torque converter.

The clutch assembly 18 is supported for rotation with the turbine assembly 14 and interposed between the turbine assembly 14 and the torque input member or front cover 20. The clutch assembly 18 illustrated in FIG. 2 is of the type commonly known as a "lock-up clutch." The lock-up clutch assembly 18 includes an annular piston 70. An annular, disk shaped, paper based frictional element or facing 72 is carried proximate to the outer peripheral flange 74 of the piston 70. The piston 70 is rotatably supported for axial movement on the turbine hub 48 into and out of engagement with the inner surface of the front cover 20 to provide direct torque transfer between the front cover 20 and the turbine assembly 14 as will be discussed in greater detail below.

The hydrodynamic torque converter 10 further includes a torsional damper, generally indicated at 76, which operatively interconnects the turbine assembly 14 and the lock-up clutch assembly 18. The torsional damper acts to dampen torsional vibrations due to impact loads and torsional pulsations generated by the internal combustion engine.

Figure 6:
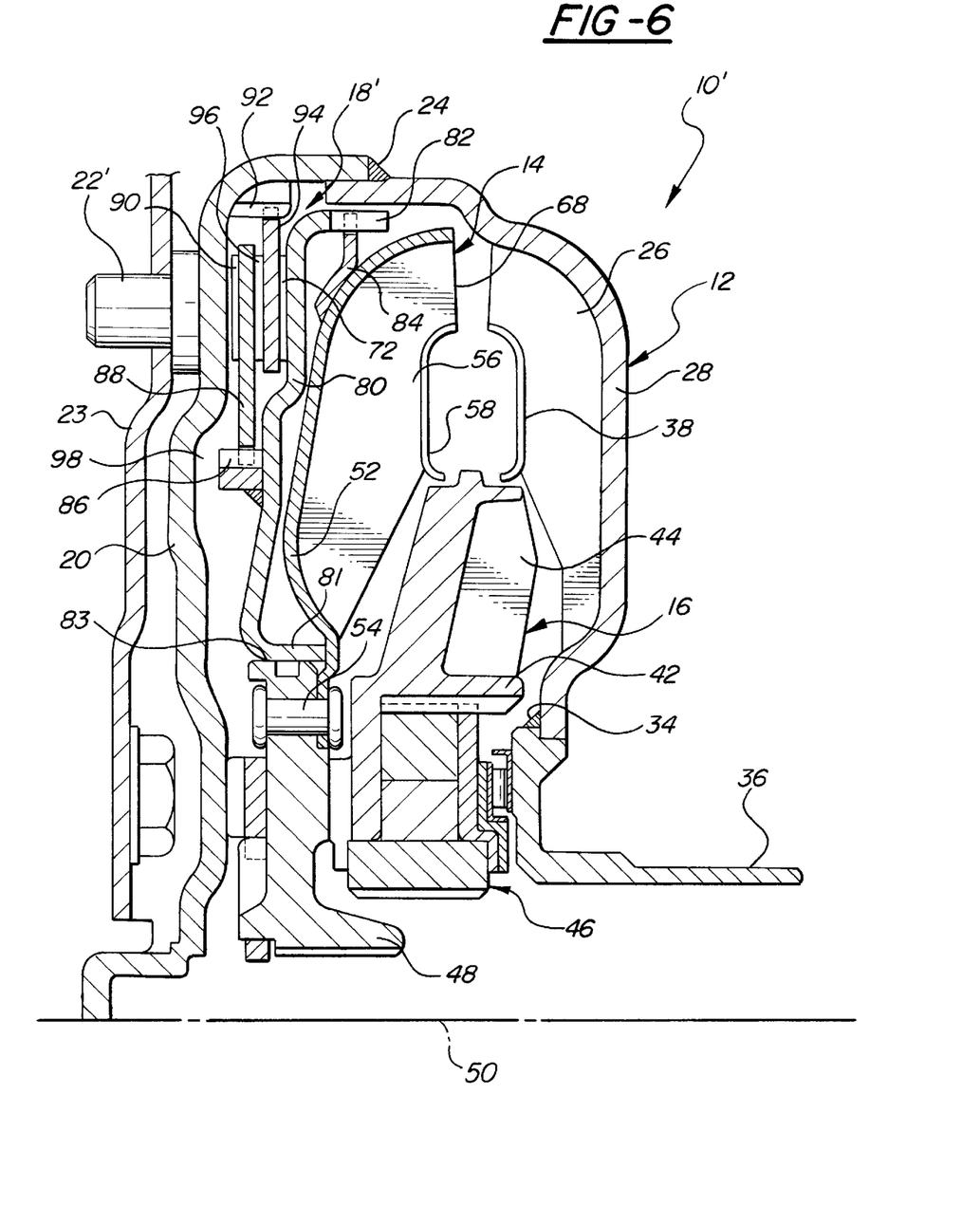
FIG. 6 is a partial cross-sectional side view of another embodiment of the torque converter of the present invention.

Turning now to another embodiment of the present invention illustrated in FIG. 6, a torque converter having a squash ratio of less than 1.0 is generally indicated at 10' where like numerals, some of which are primed, are used to designate like structure previously described with respect to FIG. 2. The structure of the torque converter 10' is substantially similar to the torque converter 10 illustrated in FIG. 2 except where noted specifically below.

The torque converter 10' includes an impeller assembly, generally indicated at 12, a turbine assembly generally indicated at 14, a stator assembly, generally indicated at 16, and a clutch assembly, generally indicated at 18'. Each of these assemblies will be described in greater detail below.

Power is transmitted from the rotating crank shaft (not shown) of the engine to a torque input member or front cover 20 of the torque converter. The front cover 20 may include a plurality of input drive lugs or threaded connectors 22'. A rotatable plate 23 is typically secured to the front cover member 20 by the connectors 22' or any other suitable fastening means as is commonly known in the art. The front cover 20 is secured, typically by welding as indicated at 24, to the impeller assembly 12 of the hydrodynamic torque converter 10.

The impeller assembly 12 is fluidly connected in torsional flow relationship in a known manner with the turbine assembly 14 and the stator assembly 16. The impeller assembly 12 includes a plurality of annularly spaced contoured impeller blades 26 connected to the inside of an impeller shell 28. The impeller shell 28 is fixed, as for example by welding at 34, to an impeller hub or host transmission hydraulic pump drive shaft 36. The impeller hub 36 may drive a pump (not shown) from which fluid is supplied to the hydrodynamic torque converter 10'. The impeller blades 26 have an arcuate inner portion which is fixed to an impeller core 38.

The stator assembly 16 is interposed between the impeller assembly 12 and the turbine assembly 14 and includes a cast stator hub 42 and a plurality of stator vanes 44 spaced circumferentially about the stator hub 42. The stator assembly 16 includes a one way clutch assembly, generally indicated at 46, for allowing the stator hub 42 and the stator vanes 44 to rotate or "free wheel" in the direction of rotation of the impeller assembly 12 and the turbine assembly 14. The stator assembly 16 locks in the opposite rotational direction during torque multiplication.

The turbine assembly 14 is fluidly connected in driven relationship with the impeller assembly 12. The turbine assembly 14 includes an annular turbine hub 48 which is operatively connected to the input of the transmission and rotatable about an axis 50. A turbine shell 52 is mounted to the turbine hub 48 via rivets 54 or some other suitable fastener. A plurality of turbine blades 56 are carried by the turbine shell 52. The turbine blades 56 include arcuate inner portions which are fixed to the turbine core 58.

Each of the turbine blades 56 illustrated in FIG. 6 may include a flat working surface 66 of the type illustrated in FIG. 3 such that each turbine blade 56 is contained in a single plane. Thus, form dies which impart contoured "ruled surfaces" are not required during the manufacture of the turbine blades 56 of the present invention. Furthermore, because the turbine blades 56 are planar and without surface curvature or contour, they may be manufactured from a low carbon steel such as SAE 1010 without the concerns of "spring back" which is typically encountered during the manufacture of contoured blades.

Each of the turbine blades 56 has a leading edge 68 which includes a point A. When viewed as illustrated in FIG. 5, the point A on each of the turbine blades 56 is disposed a distance X1 from a plane containing the axis of rotation 50 of the turbine assembly 10. This distance, X1, may be between −30 mm and 30 mm. Further and like the turbine blade illustrated in FIG. 2, the point A on the turbine blades 56 shown in FIG. 6 will be located on the mean path of the torus of the torque converter.

The clutch assembly 18' is supported for selective operation with the turbine assembly 14 and is interposed between the turbine assembly 14 and the torque input member or front cover 20 as will be described in greater detail below. The clutch assembly 18' is selectively movable into engagement with the torque input member to provide torque translation between the torque input member or front cover 20 and the turbine assembly 14 at low speed ratios. In the preferred embodiment illustrated in FIG. 6, the clutch assembly 18' is a continuous slip bypass clutch assembly that is operable to produce a slip in the range of 10–250 RPM slip between the torque input member 20 and the output of the torque converter, depending upon the vehicle speed, throttle position and the torsional activity map of the input power source. The structure associated with the lockout clutch assembly 18 and the torsional damper 76 illustrated in FIG. 2 are replaced by the continuous slip bypass clutch assembly 18'. However, the continuous slip bypass clutch assembly 18' reduces the inherent 200–400 RPM slip typically present in torque converters that do not include a lockout capability. The continuous slip bypass clutch assembly 18' of the present invention is configured to approach the efficiency of a fully locked powertrain such as is found in manual gear set transmission systems while eliminating the need for a damper assembly of the type illustrated in FIG. 2.

Furthermore, the continuous slip bypass clutch assembly 18' of the present invention also attenuates or neutralizes the vibrational disturbances generated by an internal combustion engine having its crankshaft connected to the torque converter. Such disturbances effect powertrain durability and also produce disturbing resonant vibration modes within the powertrain and/or in the body structure of a vehicle in which the powertrain is mounted. Such vibrations and other disturbances are mitigated by the continuous slip bypass clutch assembly 18' without the need for including a separate torsional damper assembly because the clutch assembly 18' provides sufficient compliance to absorb or mitigate the torsional disturbance inputted from the engine of the powertrain. Furthermore, the clutch assembly 18' of the present invention is easier to assemble than prior art torque converters having lock up clutches. The continuous slip bypass clutch assembly 18' of the present invention is also configured to control the thermal energy input to the frictional surface thereof to avoid extremely high temperatures within the clutch assembly 18' that might lead to component distortion and/or thermal degradation of the friction material in the liner as will be described in greater detail below.

The continuous slip bypass clutch assembly 18' includes an annular piston 80 which is rotatably supported for axial movement on the turbine hub 48. More specifically, the piston 80 includes an axially directed flange 81 that is slidably mounted on an outer annular surface 83 on the outer diameter of the hub 48. The piston 80 also includes a splined outer peripheral flange 82 located opposite the axially directed flange 81. A connecting member 84 welded or otherwise fixed to the turbine shell 52 engages the peripheral flange 82 to provide direct torque translation between the piston 80 and the turbine assembly as will be described in greater detail below. An annular, disk-shaped, paper based friction liner 72 is carried proximate to the outer peripheral flange 82.

A splined ring 86 is welded or otherwise affixed to the piston 80 and faces the front cover 20. A first ring-shaped friction plate 88 is carried by the splined ring 86. The friction plate 88 includes a paper based friction liner or facing 90 which is adapted to engage the front cover as will be described in greater detail below.

The front cover 20 includes an internal spline ring 92. A second ringshaped friction plate 94 is carried by the spline ring 92 and is disposed between the first ring-shaped friction plate 88 and the piston 80. The second ring-shaped friction plate 94 carries a paper based friction liner or facing 96.

The piston 80, first and second friction plates 88, 94 are all movable axially toward and away from the front cover 20 in response to pressure differentials in chamber 98 defined between the front cover 20 and the piston 80 as will be described in greater detail below.

Figure 7:
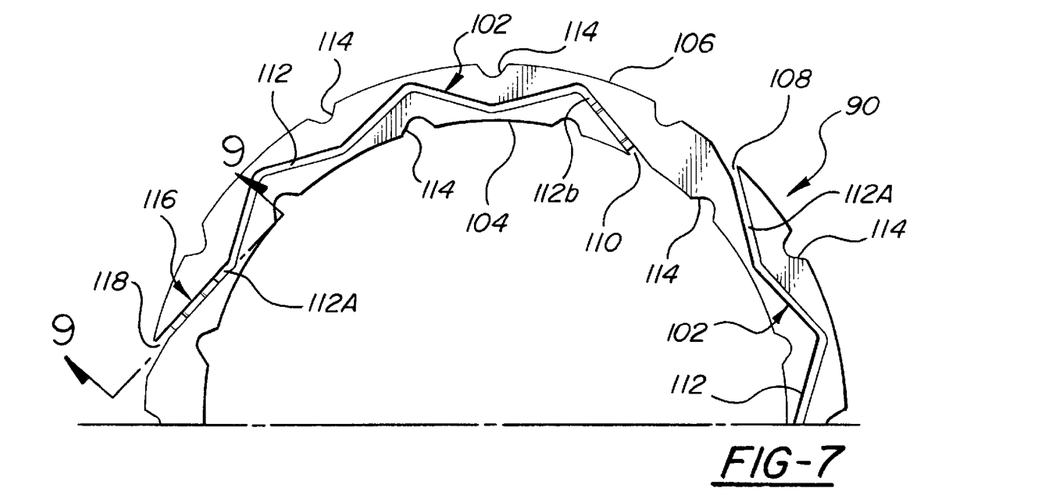
FIG. 7 is a partial plan view of the annular friction clutch facing of the present invention.
Figure 8:
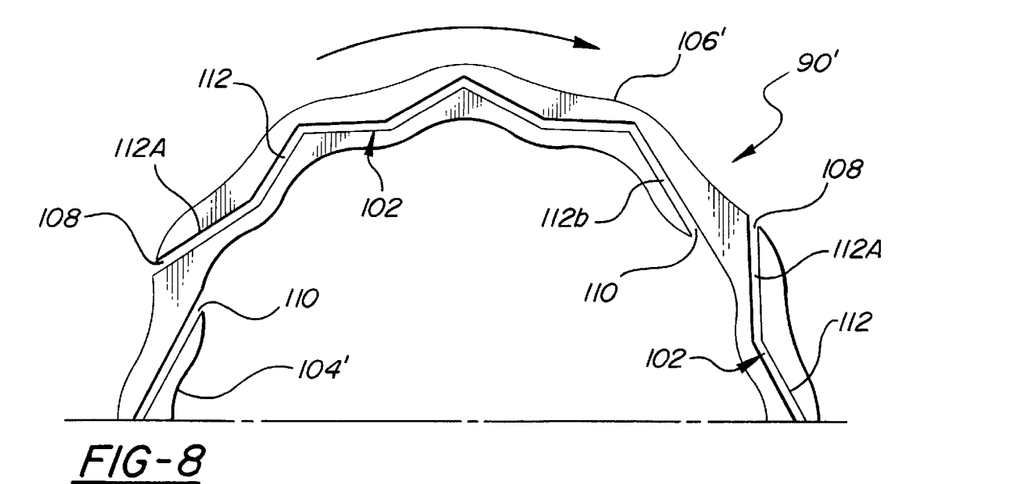
FIG. 8 is a plan view of another embodiment of the annular friction clutch facing of the present invention.

Referring now to FIGS. 7 and 8, a paper based friction liner or facing 90, 90' is shown in detail. While the description that follows focuses on the friction liner 90, 90' it will be understood that the structure of the friction liner 96 as well as friction liner 72 are substantially similar to the liners 90, 90' and so the discussion that follows applies equally as well to these friction liners. The friction liner 90, 90' includes one or more relatively simple but highly effective circuitous grooves 102 in the paper based facing. The grooves 102 operate to provide both adequate cooling and essentially full wetting of the clutch interfaces.

For example, and referring to FIG. 7, each of the friction liner 90 includes an inner and outer edge 104, 106 defining a prescribed width with at least one circuitous groove 102 extending a substantially annular distance about the friction liner 90. The grooves 102 have an inlet 108 at one end and an outlet 110 at the opposite end. The inlet 108 is open to the high pressure cavity of the torque converter at the outer edge 106 of the friction liner 90. The outlet 110 is angularly remote from the inlet 108 and is open at the inner edge 104 of the friction liner 90 to the low pressure cavity 98. Each groove 102 traverses back and forth between its inlet 108 and outlet 110 with at least three or more passes 112 across substantially the entire prescribed width of the liner 90 and thus its interface zone is exposed to direct hydraulic fluid in the torque converter from the high pressure cavity past the engaged clutch surfaces (i.e. through their interface zone) in circuitous traversing flow passes to the low pressure cavity 98. Furthermore, the inner and outer edges 104,106 may also include notches 114 which are annularly spaced about the liner 90 and located in predetermined positions for wetting the surface of the liner 90 in areas which are not effectively wetted by the groove 102. The notches 114 may be of any geometric shape but as shown in FIG. 7, the notches 114 are in the form of hemispherically shaped nicks made on the inner and outer edges 104, 106 of the liner 90.

Alternatively, and referring now to FIG. 8, where like numerals are used to designate like structure with reference to FIG. 7, the inner edge 104' may define a sinusoidal shape. Similarly, the outer edge 106' may define a sinusoidal shape. Additionally, the inner sinusoidal edge 104' may be out of phase with the outer sinusoidal edge 106'. In this way, the sinusoidal inner and outer edges 104', 106' cooperate for wetting the surface of the friction liner 90' in areas which are not effectively wetted by the groove 102.

Thus, the grooves 102 and the notches 114 or sinusoidal inner and outer edges 104', 106' cooperate to provide (a) wetting of essentially the entire area of the clutch interfaces, (b) cooling of the clutch with a viscous pumping action that augments cooling hydraulic fluid flow induced through the circuitous flow path by the pressure differential between the high and low pressure cavities, and (c) flow limiting action wherein the groove functions as a critical flow limiting orifice between the high and low pressure cavities within the torque converter.

To assist the viscous pumping action by the slipping movement between the friction liners 90, 90', 96, or 72 and the opposite interface, the circuitous grooves 102 have a traversing inlet section 112A that forms one of the traversing passes (i.e. the entry pass) and is angled generally opposite the direction of the converter bypass clutch rotation indicated by the arrow in FIG. 8. In addition, the grooves 102 have a traversing outlet section 112B that also forms one of the traversing passes (i.e. the exit pass) and is angled generally in the direction of rotation. These angles may be varied to either increase or decrease the pumping action caused by their leading and trailing directions apart from the flow induced in the groove 102 by the pressure differential between the high and low pressure cavities. Furthermore, and depending on the application, there may be only one such circuitous groove 102 or a plurality of such grooves that form the groove pattern and are angularly spaced about the one clutch facing with the flow area of the grooves 102, the number of traversing passes of the grooves 102, and the length of the grooves all being variable at the discretion of the designer to appropriately control the hydraulic flow and establish adequate wetting and cooling of the interface zone. For example, in the embodiment in FIG. 8 appropriate flow control for a converter with a continuous slip bypass clutch with three interface zones as in the clutch 18' shown in FIG. 6 and a maximum flow rate through the converter of about 1 gpm is provided with four such grooves 102 (only three being shown) that are equally angularly spaced in quadrants about the interface with the grooves 102 all being identical and having a uniform cross-section or flow area along their length of rectangular shape measuring about 0.10 inches wide and 0.030–0.040 inches deep and traversing the interior face zone seven times or in seven passes. It will be further appreciated that in the case of multiple grooves 102 as shown, they are connected in parallel with each other between the high and low pressure cavities. Further, the grooves 102 are not intersected by any other form of groove and thus operate independently in providing the wetting, cooling and flow limiting action with uninterrupted but limited flow through each groove 102. Where there are less interface zones and thus less friction liners (e.g. only one) the number of circuitous grooves 102 may be increased and/or the flow area of the grooves may be increased to maintain the desired flow control by the grooves. Alternatively, where there are more interface zones, the number of circuitous grooves 102 may be decreased and/or the flow area of the grooves may be decreased to maintain the desired flow control by the grooves. It will be understood that there may be only one such circuitous groove 102 in the friction liner 90, 90', 96 or 72 that extends substantially completely therearound and has a very large number of traversing passes 112 (e.g. 20 passes) between its inlet 108 and outlet 110 and wherein the groove flow area is determined to provide the desired flow control by this singular groove.

Figure 9:
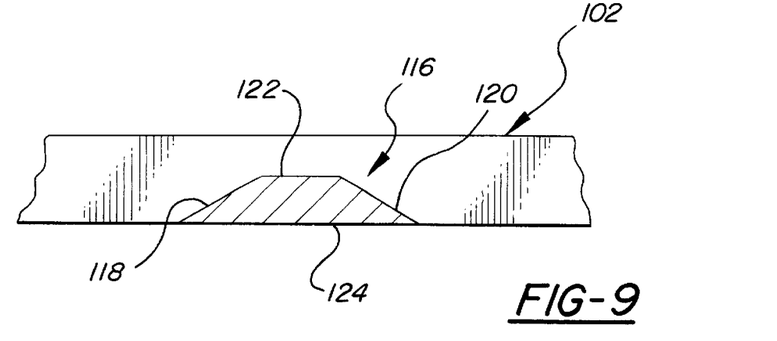
FIG. 9 is a partial cross-sectional side view of the bridge portion in the circuitous groove taken along lines 9—9 of FIG. 7.

Notwithstanding the number of circuitous grooves 102 and the number of passes 112 of each groove, each of the grooves 102 will include at least one bridge portion 116 spanning a portion of the circuitous groove to interconnect either side of the groove in the friction liner 90. The bridge portion 116 serves the function of interconnecting opposite sides of the groove 102 which is cut into the paper based liner and segments the liner 90. Thus, the bridge portions 116 function to maintain the friction liner 90 in one piece. The bridge portion 116 is embossed on the clutch facing or friction liner 90 in the groove 102 and extends not more than one half the height of the groove 102. As illustrated in FIG. 9, the bridge portion 116 may have a trapezoidal shape in cross-section. More specifically, the bridge portion 116 may include a pair of slanted edges or sides 118, 120 forming obtuse angles with the groove 102 in the direction of the fluid flow path and a pair of parallel sides 122, 124 forming the top and bottom of the bridge 116, respectively. Alternatively, the bridge portion 116 may be any other geometric shape.

The multi-function wetting/cooling/flow limiting grooves 102 in conjunction with the notches 114 and/or sinusoidal inner and outer edges 104', 106' of the friction liner 90, 90' provide for a wide flexibility in controlling the hydraulic flow through the clutch interface zone when subjected to the relatively high and low pressures in the high and low pressure cavities at the respective outer and inner edges of the friction liners 90, 90', 96, 72 wherein the differential pressure between these cavities may vary for example from a high of about 120 psi to a low of about 20 psi to control the clutch slip speed. In addition, the circuitous form of the groove 102 of the present invention wherein each of the one or more grooves intermediate its inlet 108 and outlet 110 extends transversely along its length back and forth at least three or more passes 112 across essentially the full width of the friction liner and wherein the inlet and outlet passes 112A, 112B of the groove 102 sweep the area of the interface zone that is not swept by the intermediate passes, provide the capacity of maximizing the percentage of friction surface traversed by the groove pattern resulting in a minimum potential for the development of dry friction anywhere in the interface zone. And with dry friction minimized or eliminated, the interface temperatures are reduced dramatically thereby significantly improving the ability to maintain consistent friction characteristics with time and total wear of the friction surfaces and resulting in a significantly extended clutch life.

Moreover, the grooves 102 are readily manufacturable in a cost effective manner in that they are die cut in the paper based friction liners 90, 90', 96, 72 together with the overall shape of the friction liners prior to their bonding to the clutch plates. Low cost rule-dies or punch and die sets may be used to produce the grooved friction liners from flat paper based friction material stock at very high production rates whether the desired groove form is a straight section groove form or a sinusoidal groove form or some other suitable groove wave form. The bridge portions 116 in the grooves 102 ensure that no matter what the form of groove, the friction liner produced in this manufacturing process will be a one piece unit which may be quickly and easily bonded to the clutch plates thereby avoiding the occasion for multiple pieces which must be reassembled as in the friction liners known in the prior art.

OPERATION OF THE TORQUE CONVERTER

Rotation of the crank shaft of the engine causes the front cover 20 to rotate with it through the actuation of the plate member 23. The front cover 20 is welded at 24 to the impeller shell 28. Therefore, the impeller assembly 12 rotates with the crankshaft. The fluid within the impeller assembly 12 is set into motion by the rotation of the impeller assembly 12 which is kept filled by the fluid pressure from a host transmission hydraulic pump (not shown). The impeller blades 26 transfer mechanical energy into hydrokinetic energy. As the fluid is put into motion by the impeller blades 26, it is thrown outward by centrifugal forces and deflected into the turbine assembly 14 at an angle. The fluid strikes the flat turbine blades 56 of the turbine assembly 14, thus imparting torque or turning effort to the turbine assembly 14 and causing the turbine shell 52 to rotate about its axis 50. The turbine shell 52 is connected by rivets 54 to the turbine hub 48. The turbine hub 48 is, in turn, operatively connected to the input of the transmission.

The hydraulic fluid (ATF) is circulated through the converter for operation of the impeller, turbine and stator and also operation and control of the continuously slipping bypass clutch in a well known manner. In such operation, the converter stator provides torque multiplication that decreases as the turbine speed approaches impeller speed and the continuously slipping bypass clutch is engaged by action of the piston/clutch plate to continuously slip at a controlled rate while mechanically transmitted the torque in bypass or parallel relationship to the hydraulic path via the converter impeller and turbine.

During initial launch of the vehicle and operation of the hydrodynamic torque converter 10' at low speed ratios, the continuous slip clutch assembly 18' is not engaged. Thus, torque is imparted to the input of the transmission via the turbine assembly 14. However, at relatively low speed ratios, for example below 0.9, the clutch assembly 18' of torque converter 10' of the present invention is applied. In this event, fluid pressure is reduced in chamber 98 and piston 80 moves axially on turbine hub 48. The friction disk 72 on the piston 80 engages the second ring-shaped friction plate 94 moving it axially to engage the first ring-shaped friction plate 88. The friction liner 90 carried on the first ring-shaped friction plate 88 is then pressed into engagement with the front cover to translate torque between the front cover 20 through the continuous slip bypass clutch assembly 18' directly to the turbine assembly 14 and the input to the transmission.

In the preferred embodiment, the clutch assembly 18' is selectively movable into engagement with the torque input member or front cover 20 at speed ratios between 0.6 and 0.9. More specifically, the clutch assembly 18' is selectively movable into engagement with the torque input member or front cover 20 at the approximate coupling point of the torque converter.

The torque converter 10 illustrated in FIG. 2 operates in substantially the same manner. However, there, the clutch assembly 18 is actuated when the piston 70 is applied. Fluid pushes the piston 70 against the front cover 20 with the friction disk 72 sandwiched between the two elements. The flow of power or engine torque is then transmitted through the front cover 20 and the piston 70 directly to the turbine assembly 14 and the input to the transmission. Therefore, the front cover, clutch assembly 18, turbine assembly 14 and the input to the transmission rotate together.

Figure 10:
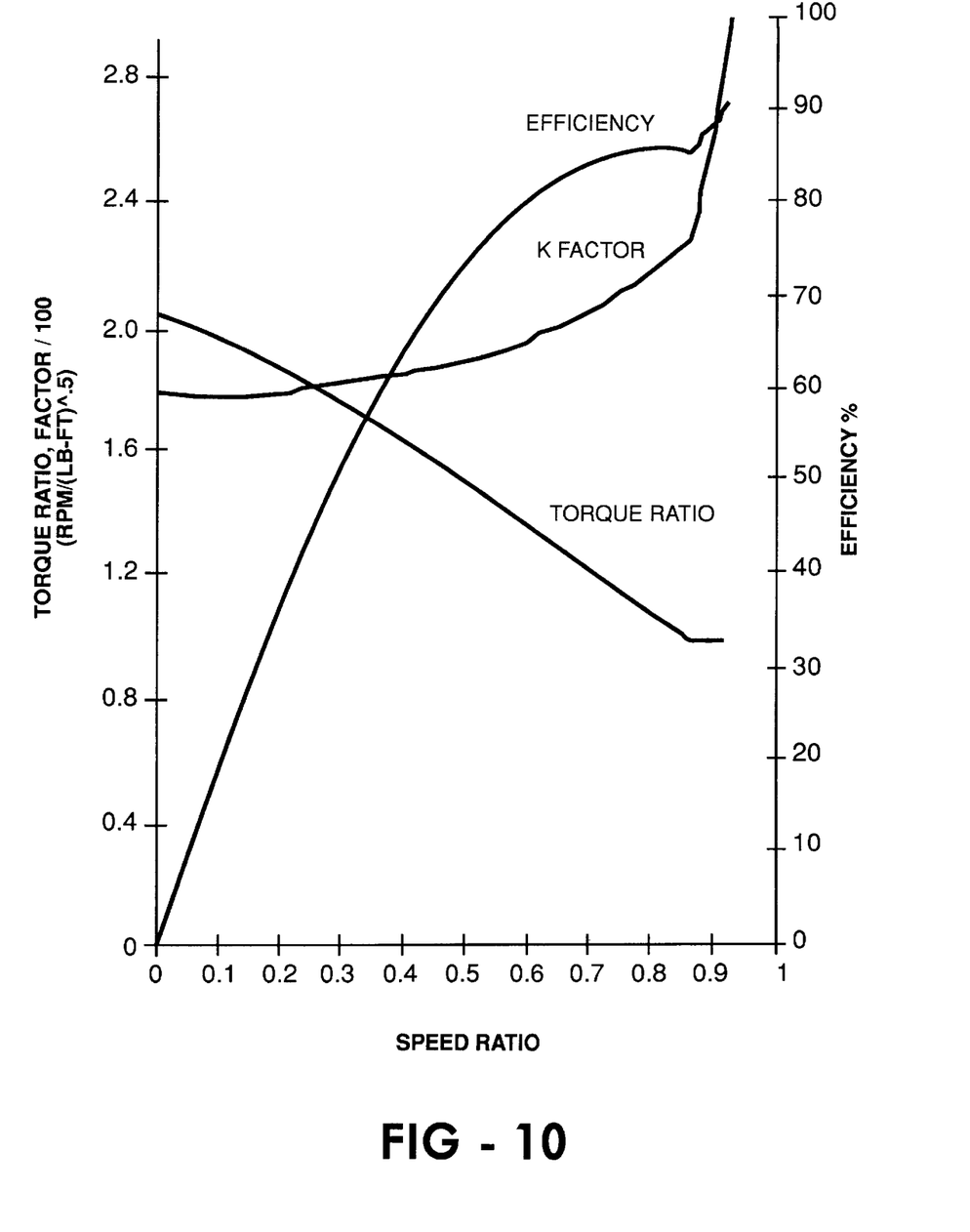
FIG. 10 is a graph of conventional torque converter performance characteristics including efficiency, torque ratio and K-factor.
Figure 11:
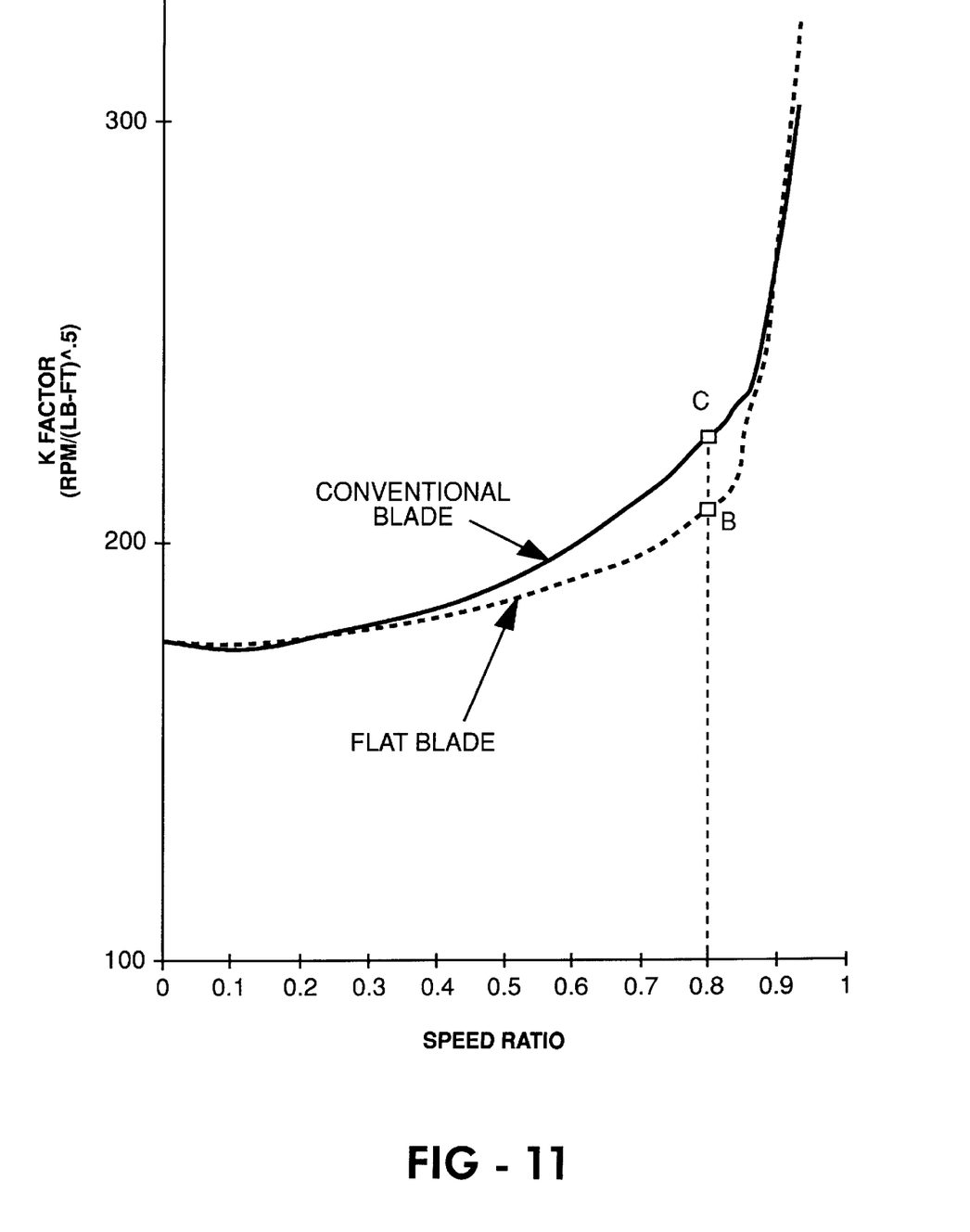
FIG. 11 is a graph of torque converter K-factor versus speed ratio generated using the flat turbine blade of the present invention versus conventional turbine blade.
Figure 12:
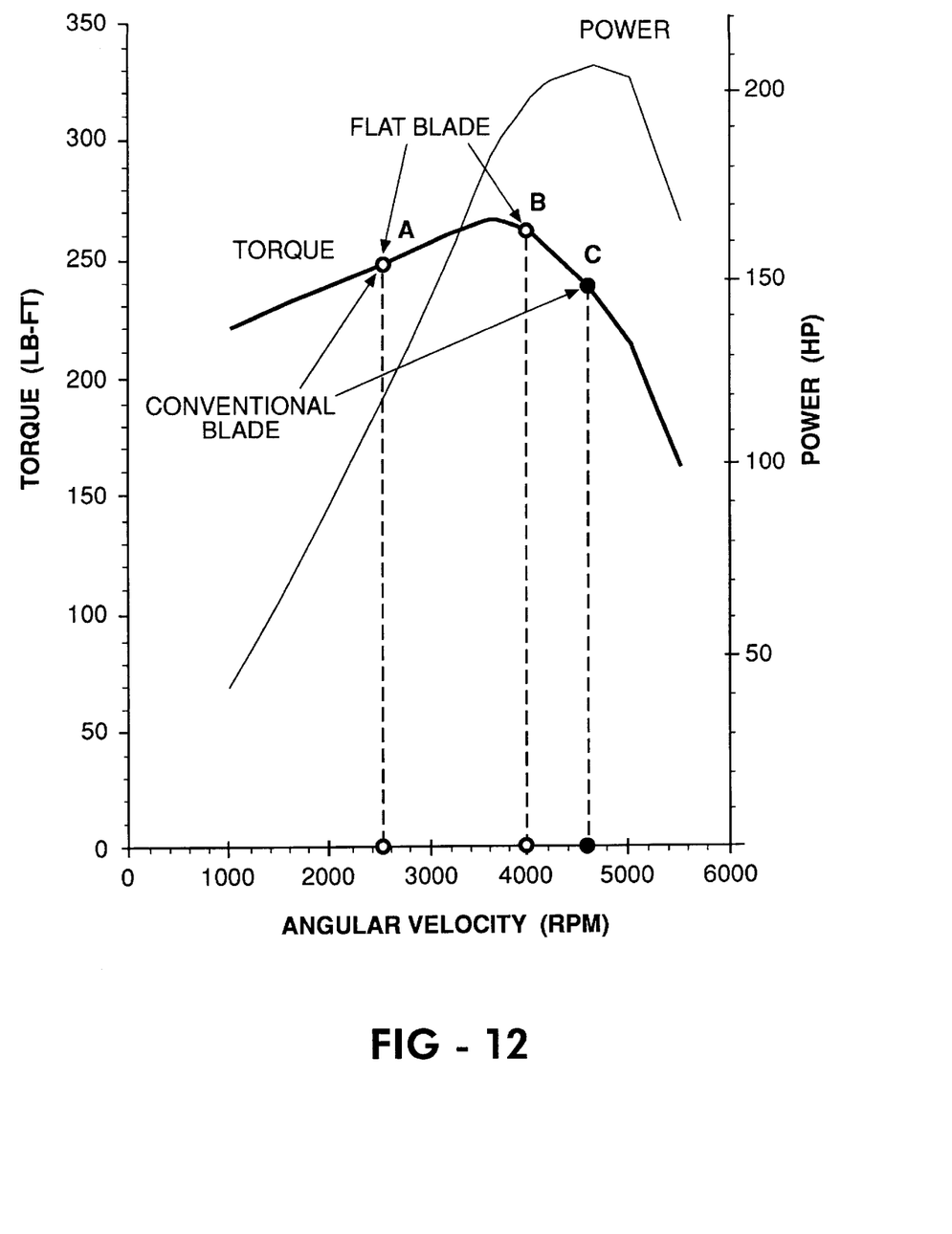
FIG. 12 is a graph comparing typical engine characteristics between a torque converter employing a conventional blade and a torque converter employing a turbine blade of the present invention.

FIG. 10 illustrates a conventional torque converter performance characteristics including efficiency, torque ratio and K-factor. The torque converter 10, 10' of the present invention is used primarily as a launch device. Therefore, beyond approximately a 0.7 speed ratio, the efficiency of the torque converter 10, 10' becomes less important. Thus, from a design standpoint, it is important to flatten the K-factor curve at speed ratios below approximately 0.8. As noted earlier, minimizing the torroidal axial length versus toroidal radial dimension (L/R1–R2), i.e., increasing the squash of the torque converter, has a negative effect on the K-factor curve. This reduces the efficiency of the conventional torque converters and the fuel economy of the engine. However, using the flat turbine blade 56 of the present invention spatially positioned relative to the axis of rotation 50, the K-factor curve is not negatively effected, even where the ratio of axial length L to radial dimension ($R_1$–$R_2$) is less than 1.0. This is also true for extreme torroidal axial squash of between 0.5 and 0.95. This fact is demonstrated graphically in FIG. 11 where the K-factor curve of a conventional blade is compared with that of the turbine blade 56 of the present invention at squash ratios of less than 1.0. The K-factor curve of the torque converter 10, 10' employing the spatially positioned flat turbine blade 56 of the present invention is flatter than that of the conventional blade, even at high speed ratios. Further, and by plotting points B and C from FIG. 11 onto the torque curve of FIG. 12, it is shown that, at 0.8 speed ratio, engine torque is optimized at lower engine speed as indicated at point B for the flat blade 56 as opposed to point C for the conventional, contoured blade. Thus, vehicle acceleration and fuel economy can be improved when the torque converter of the present invention is properly matched with a given engine.

The benefits derived by the present invention are not limited to torque converters having extreme torroidal axial squash. The spatially positioned flat turbine blade 56 may also be employed in torque converters where the squash ratio is 0.95 to 1.3 or more to help reduce vehicle emissions and improve fuel economy. This is true because even where torroidal axial squash is not extreme, the spatially oriented flat turbine blade 56 of the present invention results in flatter K-factor curves through a wide range of speed ratios and maximizes engine torque at lower engine speeds. Furthermore, vehicle acceleration and fuel economy can be improved together with drawbar pull and tractive effort (for industrial applications) where the torque converter of the present invention is properly matched with a given engine.

Accordingly, the flat, spatially positioned turbine blade 56 of the present invention is much less expensive to manufacture than conventional blades and has less performance sensitivity and better performance stability than conventional turbine blades employed in torque converters of the related art. Furthermore, torque converters employing turbine blades of the present invention exhibit flatter K-factor curves at high speed ratios even at extreme torroidal axial squash. Thus, the packaging characteristics for torque converters 10, 10' of the present invention may be improved without a reduction in fuel economy and vehicle acceleration.

Figure 13:
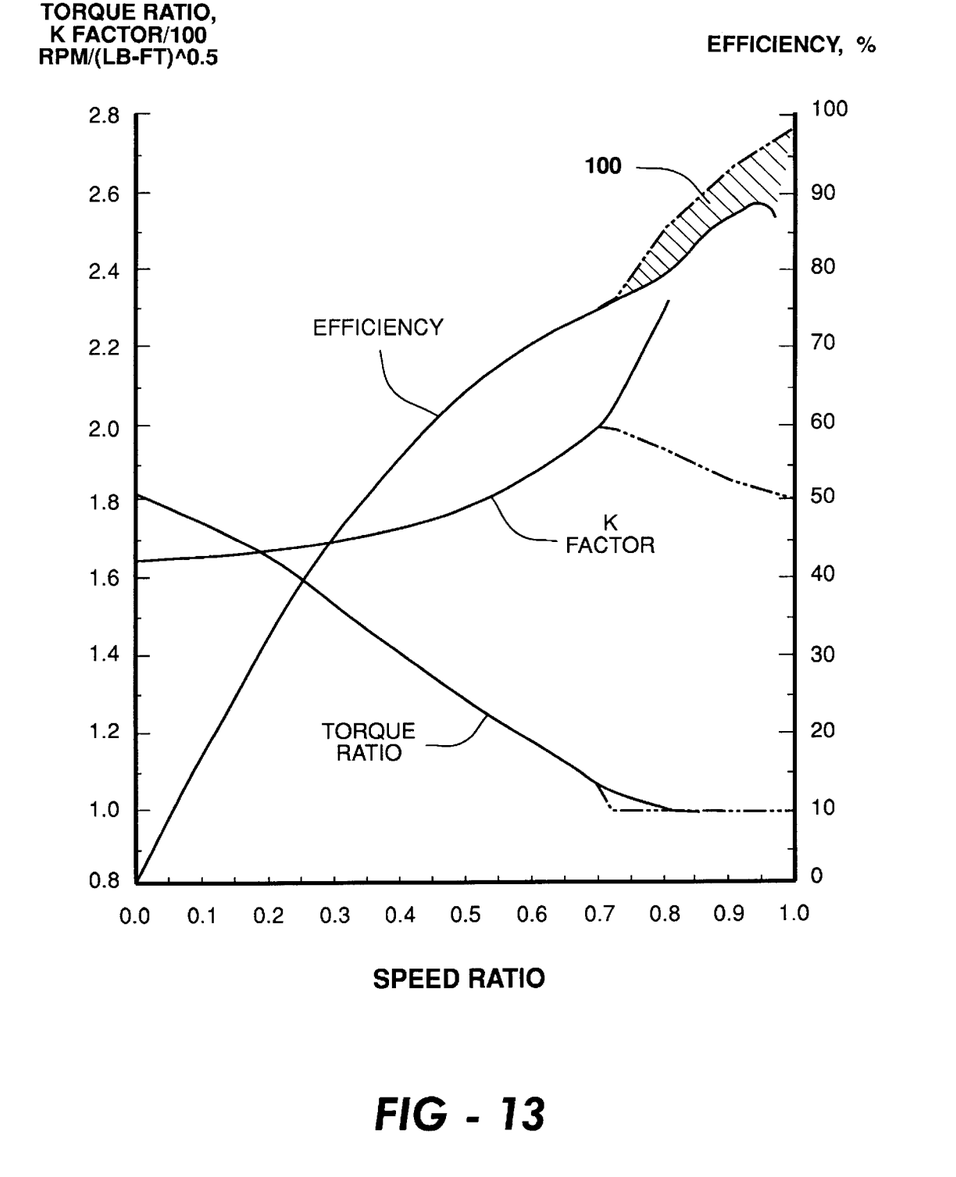
FIG. 13 is a graph illustrating the improvements which result in the efficiency, K-factor and torque ratios from the torque converter of the present invention.

The improved operating parameters of the torque converter 10, 10' of the present invention are further demonstrated in FIG. 13 which illustrates the gain in efficiency resulting from the operation of the clutch assemblies 18, 18' at low speed ratios. More specifically, the dotted lines on each of the efficiency, K-factor and torque ratio curves in FIG. 13 track improvements derived from the present invention. The crosshatched portion 100 on the efficiency curve illustrates the efficiency gains discussed above. Note also the flatter dotted K-factor curve when compared with the solid K-factor curve typical of torque converters in the related art. The coupling point (torque ratio=1.0) is also achieved at lower speed ratios as illustrated with the torque ratio curve. The clutch assembly 18, 18' of the present invention operates at lower speed ratios thereby avoiding inherent slip which occurs at torque ratios above the coupling point. The clutch assembly 18' has the added advantage of eliminating the torsional damper thereby reducing weight, cost and complexity of the torque converter. At the same time, the torque converter 10, 10' of the present invention does not translate drive line vibrations, etc. even when operated at these lower engine speeds (and speed ratios).

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What we claim is:

1. A torque converter for translating kinetic energy between a prime mover and a transmission, said torque converter comprising:

a torque input member and an impeller assembly operatively coupled for rotation with said torque input member;

a turbine assembly fluidly connected in driven relationship with said impeller assembly; and a continuously slipping clutch assembly supported for selective operation with said turbine assembly and interposed between said turbine assembly and said torque input member, said clutch assembly selectively movable into engagement with said torque input member to provide torque translation between said torque input member and said turbine assembly at speed ratios below the coupling point of said torque converter.

2. A torque converter as set forth in claim 1 wherein said clutch assembly is selectively movable into engagement with said torque input member at speed ratios below 0.9.

3. A torque converter as set forth in claim 1 wherein said clutch assembly is selectively movable into engagement with said torque input member at speed ratios between 0.6 and 0.9.

4. A torque converter as set forth in claim 1 wherein said clutch assembly is selectively movable into engagement with said torque input member before the torque ratio is less than 1.0.

5. A torque converter as set forth in claim 1 wherein said clutch assembly is selectively movable into engagement with said torque input member at the approximate coupling point of said torque converter.

6. A torque converter as set forth in claim 1 wherein said torque converter has a squash ratio of less than 1.0.

7. A torque converter as set forth in claim 1 wherein said turbine assembly is rotatable about an axis and includes a shell, a core, and a plurality of turbine blades mounted therebetween, each of said turbine blades having flat working surfaces such that each of said turbine blades defines a single plane.

8. A torque converter as set forth in claim 7 wherein each of said turbine blades is positioned spatially so as to define an angle $\alpha$ of between $-5°$ and $65°$ relative to the axis of rotation of said turbine assembly.

9. A torque converter as set forth in claim 8 wherein each of said turbine blades has a leading edge including a point A which is disposed a predetermined distance X1 from a plane containing said axis of rotation of said turbine between $-30$ mm and 30 mm.

10. A torque converter for translating kinetic energy between a prime mover and a transmission, said torque converter comprising:

a torque input member and an impeller assembly operatively coupled for rotation with said torque input member;

a turbine assembly fluidly connected in driven relationship with said impeller assembly;

a clutch assembly supported for selective operation with said turbine assembly and interposed between said turbine assembly and said torque input member, said clutch assembly selectively movable into engagement with said torque input member to provide torque translation between the torque input member and said turbine assembly at the approximate coupling point of said torque converter, and said torque converter having a squash ratio of less than 1.0.

11. A torque converter as set forth in claim 10 wherein said clutch assembly is selectively movable into engagement with said torque input member at speed ratios below 0.9.

12. A torque converter as set forth in claim 10 wherein said clutch assembly is selectively movable into engagement with said torque input member at speed ratios between 0.6 and 0.9.

13. A torque converter as set forth in claim 10 wherein said clutch assembly is selectively movable into engagement with said torque input member before the torque ratio is less than 1.0.

14. A torque converter as set forth in claim 10 wherein said clutch assembly is a continuously slipping clutch.

15. A torque converter as set forth in claim 10 wherein said turbine assembly is rotatable about an axis and includes a shell, a core, and a plurality of turbine blades mounted therebetween, each of said turbine blades having flat working surfaces such that each of said turbine blades defines a single plane.

16. A torque converter as set forth in claim 15 wherein each of said turbine blades is positioned spatially so as to define an angle $\alpha$ of between $-5°$ and $65°$ relative to the axis of rotation of said turbine assembly.

17. A torque converter as set forth in claim 16 wherein each of said turbine blades has a leading edge including a point A which is disposed a predetermined distance X1 from a plane containing said axis of rotation of said turbine between $-30$ mm and 30 mm.

18. An annular friction clutch facing for a hydrokinetic torque converter clutch, said facing having an inner and outer edge defining a prescribed width and at least one circuitous groove cut into said facing so as to define at least two separate portions thereof and extending a substantial annular distance about said facing adapted to direct hydraulic fluid in a hydrokinetic torque converter from a high pressure cavity at said outer edge of said facing and across said width of said facing in a circuitous path in at least three transversing passes to a low pressure cavity at said inner edge of said facing, said groove having an inlet section that defines one of said passes with said inlet section including an inlet that is adapted to open said groove at said outer edge of said facing to said high pressure cavity, and said groove having an outlet section that defines another of said passes and has an outlet that is adapted to open said groove at said inner edge of said facing to said low pressure cavity at a location remote from said inlet, said circuitous groove including at least one bridge portion spanning a portion of said at least one circuitous groove to interconnect said portions of said clutch facing.

19. An annular friction clutch facing as set forth in claim 18 wherein said at least one bridge portion is embossed on the clutch facing in said groove and extends not more than one half the height of said groove.

20. An annular friction clutch facing as set forth in claim 18 wherein said bridge portion has a trapezoidal shape in cross-section.

21. An annular friction clutch facing as set forth in claim 18 wherein said inner and outer edges include notches annularly spaced about said facing located in predetermined positions for wetting surfaces of said facing in areas that are not effectively wetted by said circuitous groove.

22. An annular friction clutch facing as set forth in claim 18 wherein said inner edge defines a sinusoidal shape and said outer edge defines a sinusoidal shape, said inner and outer sinusoidal edges for wetting surfaces of said facing in areas which are not effectively wetted by said circuitous groove.

23. An annular friction clutch facing as set forth in claim 22 wherein said sinusoidal shape of said inner edge is out of phase with said sinusoidal shape of said outer edge.

24. An annular friction clutch facing as set forth in claim 18 wherein said groove has a rectangular cross-sectional flow area with a relatively small depth and a relatively large width.

25. An annular friction clutch facing as set forth in claim 18 wherein said groove has a smooth sinusoidal shape with apexes located closely adjacent the edges that the apexes are nearest to.

26. A torque converter for translating kinetic energy between a prime mover and a transmission, said torque converter comprising:
   a torque input member and an impeller assembly operatively coupled for rotation with said torque input member;
   a turbine assembly fluidly connected in driven relationship with said impeller assembly; and
   a continuously slipping bypass clutch assembly supported for selective operation with said turbine assembly and interposed between said turbine assembly and said torque input member, said continuously slipping clutch assembly having at least one pair of annular friction clutch facings that are adapted to engage while rotating in one direction and continuously slipping relative to each other to effect torque transmission therebetween, said facing having an inner and outer edge defining a prescribed width and at least one circuitous groove cut into said facing so as to define at least two separate portions thereof and extending a substantial annular distance about said facing adapted to direct hydraulic fluid in a hydrokinetic torque converter from a high pressure cavity at said outer edge of said facing and across said width of said facing in a circuitous path in at least three transversing passes to a low pressure cavity at said inner edge of said facing, said groove having an inlet section that defines one of said passes with said inlet section including an inlet that is adapted to open said groove at said outer edge of said facing to said high pressure cavity, and said groove having an outlet section that defines another of said passes and has an outlet that is adapted to open said groove at said inner edge of said facing to said low pressure cavity at a location remote from said inlet, said circuitous groove including at least one bridge portion spanning a portion of said at least one circuitous groove to interconnect said portions of said clutch facing.

27. An annular friction clutch facing as set forth in claim 26 wherein said at least one bridge portion is embossed on the clutch facing in said groove and extends not more than one half the height of said groove.

28. An annular friction clutch facing as set forth in claim 26 wherein said bridge portion has a trapezoidal shape in cross-section.

29. An annular friction clutch facing as set forth in claim 26 wherein said inner and outer edges include notches annularly spaced about said facing located in predetermined positions for wetting surfaces of said facing in areas that are not effectively wetted by said circuitous groove.

30. An annular friction clutch facing as set forth in claim 26 wherein said inner edge defines a sinusoidal shape and said outer edge defines a sinusoidal shape, said inner and outer sinusoidal edges for wetting surfaces of said facing in areas which are not effectively wetted by said circuitous groove.

31. An annular friction clutch facing as set forth in claim 30 wherein said sinusoidal shape of said inner edge is out of phase with said sinusoidal shape of said outer edge.

32. An annular friction clutch facing as set forth in claim 26 wherein said groove has a rectangular cross-sectional flow area with a relatively small depth and a relatively large width.

33. An annular friction clutch facing as set forth in claim 26 wherein said groove has a smooth sinusoidal shape with apexes located closely adjacent the edges that the apexes are nearest to.

* * * * *